Sept. 9, 1969  A. J. CHOREY  3,465,929
CAR TOP CARRIERS
Filed April 4, 1967  7 Sheets-Sheet 1
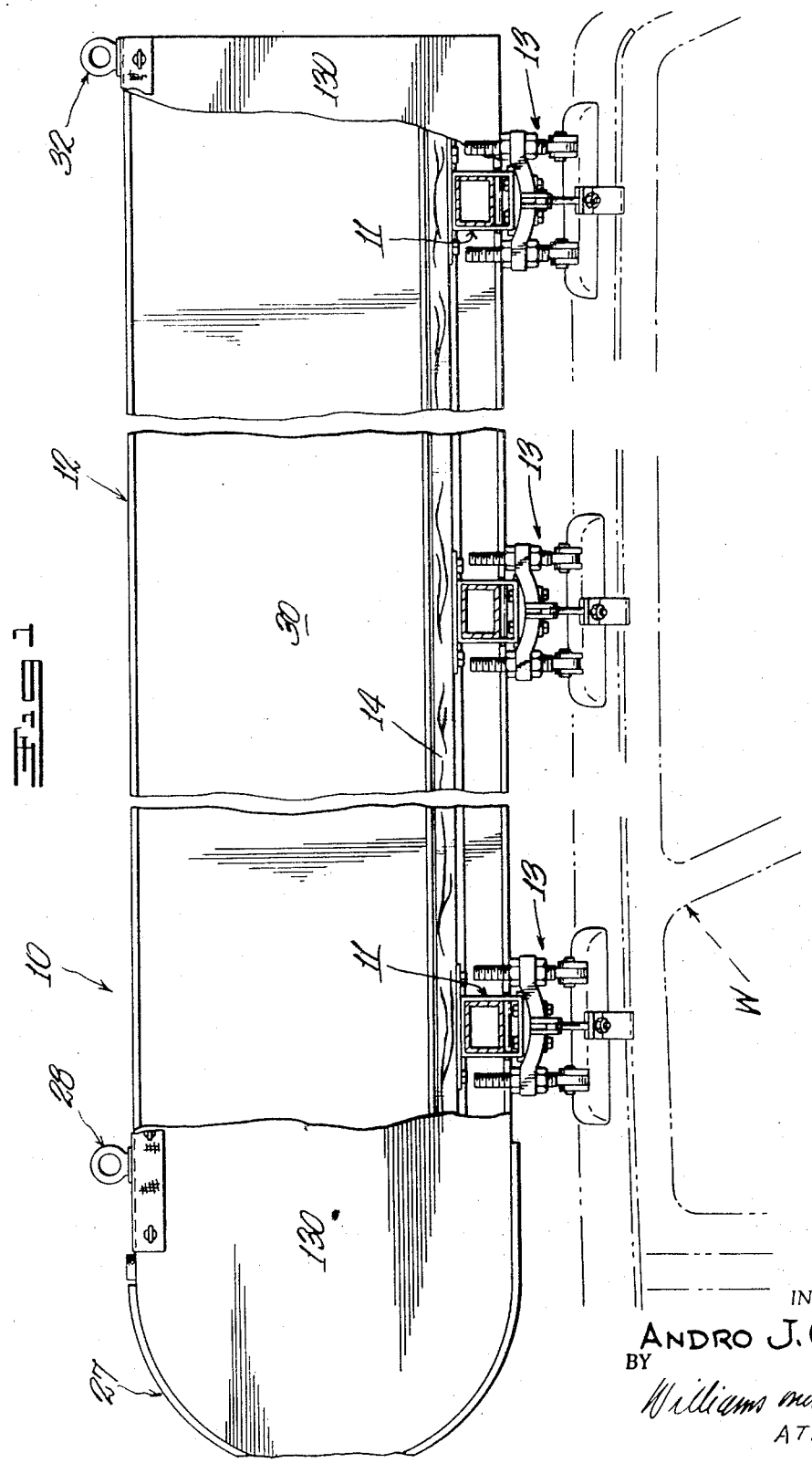
INVENTOR.
ANDRO J. CHOREY
BY
Williams and Kreske
ATTORNEYS

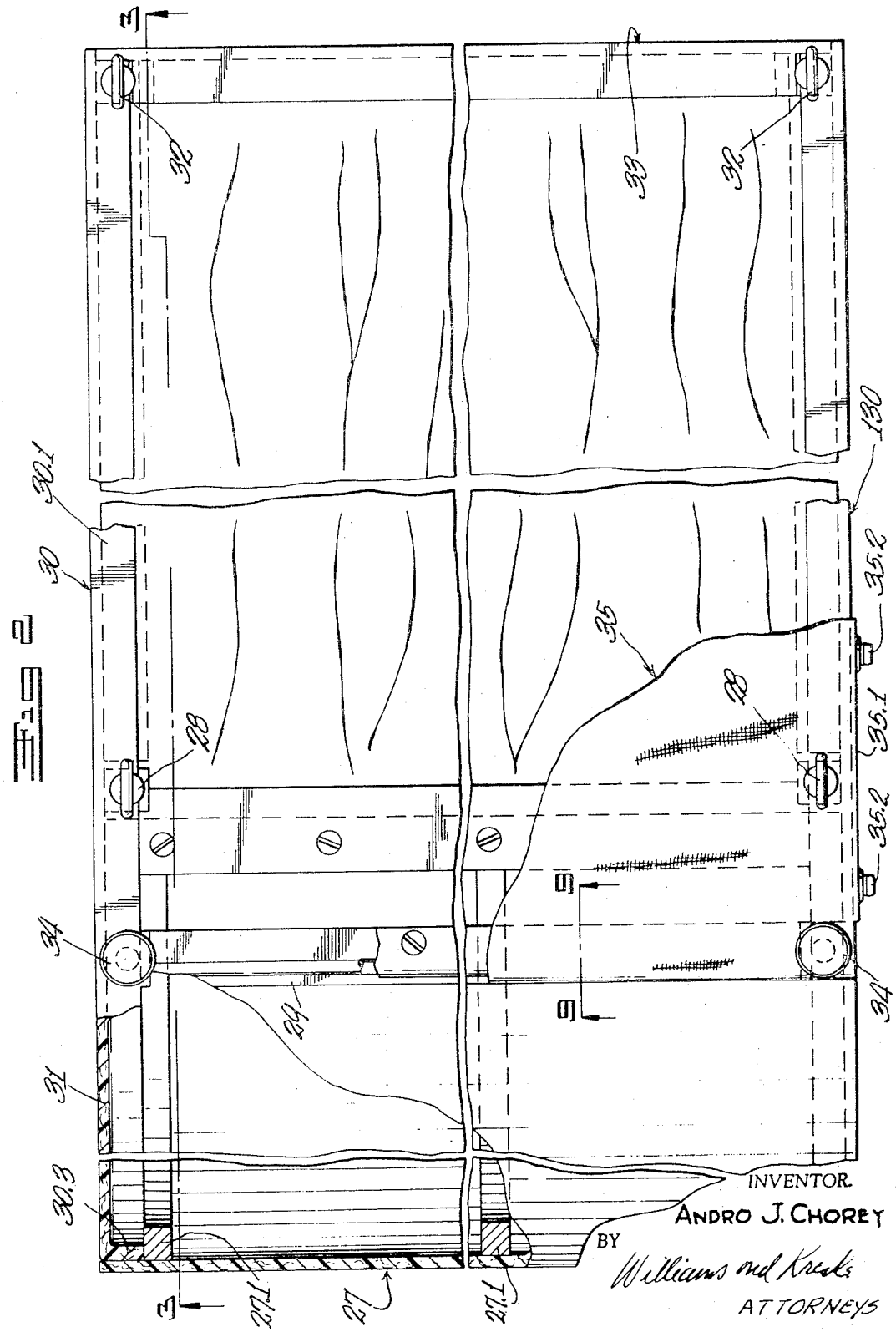

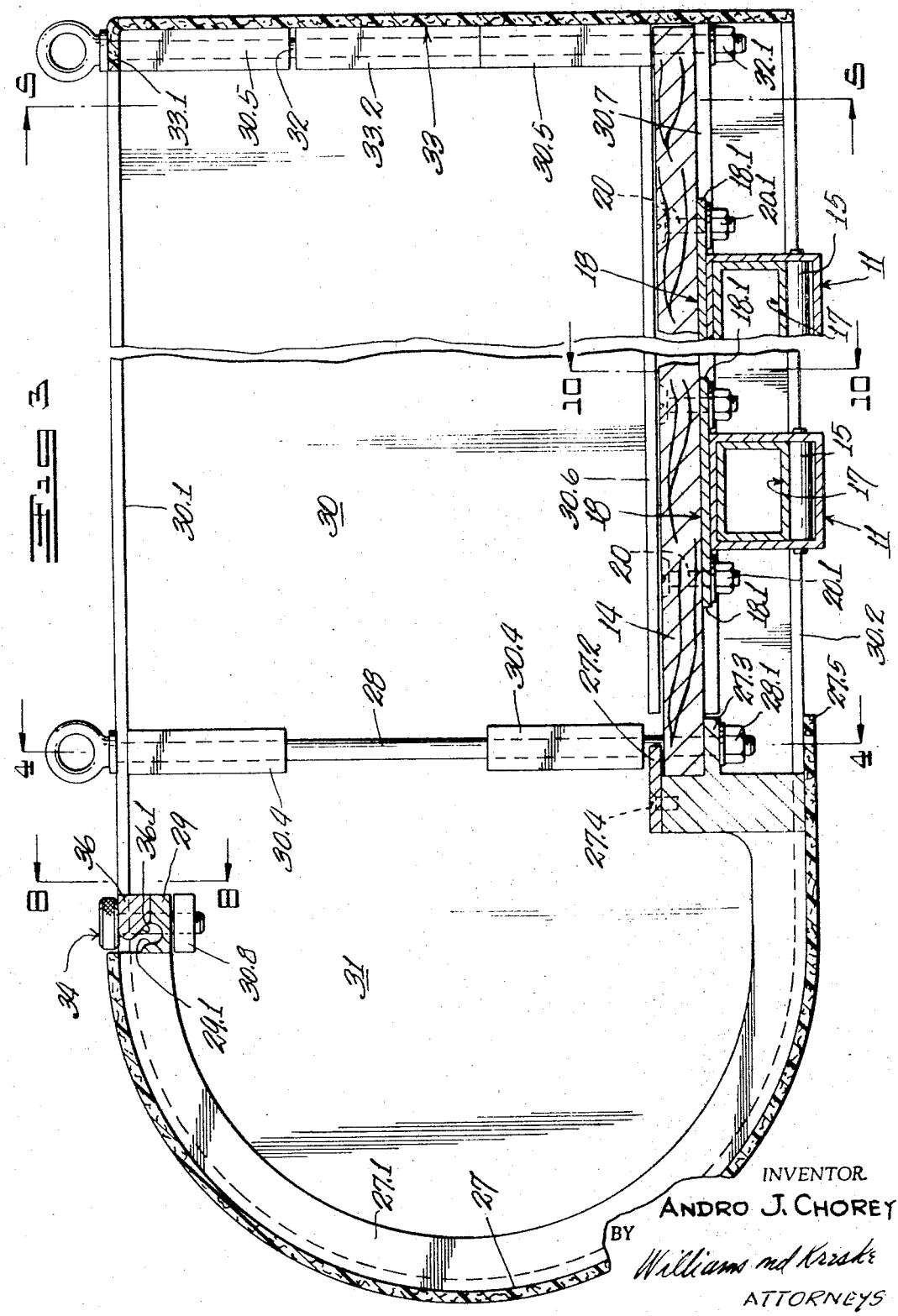

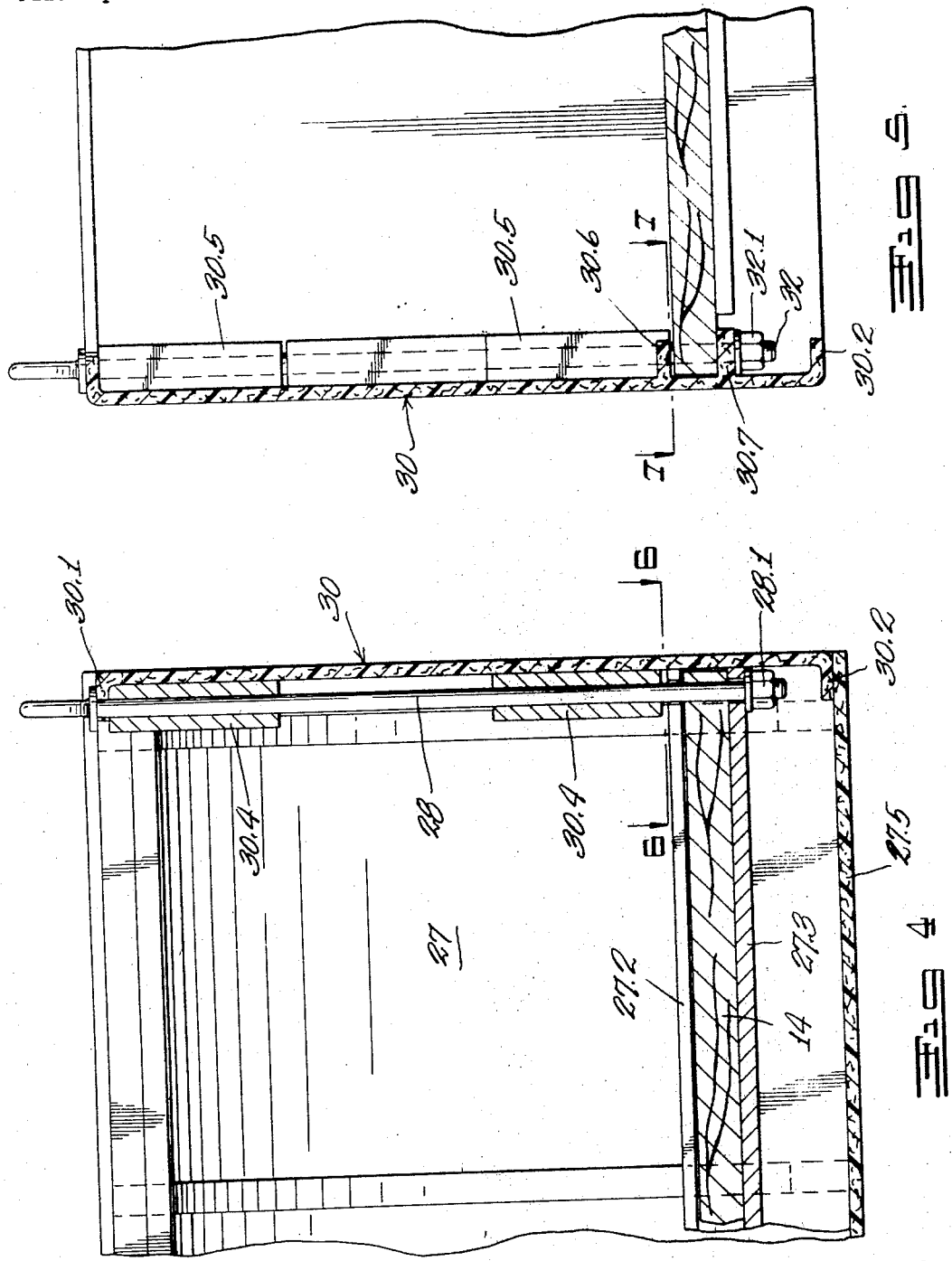

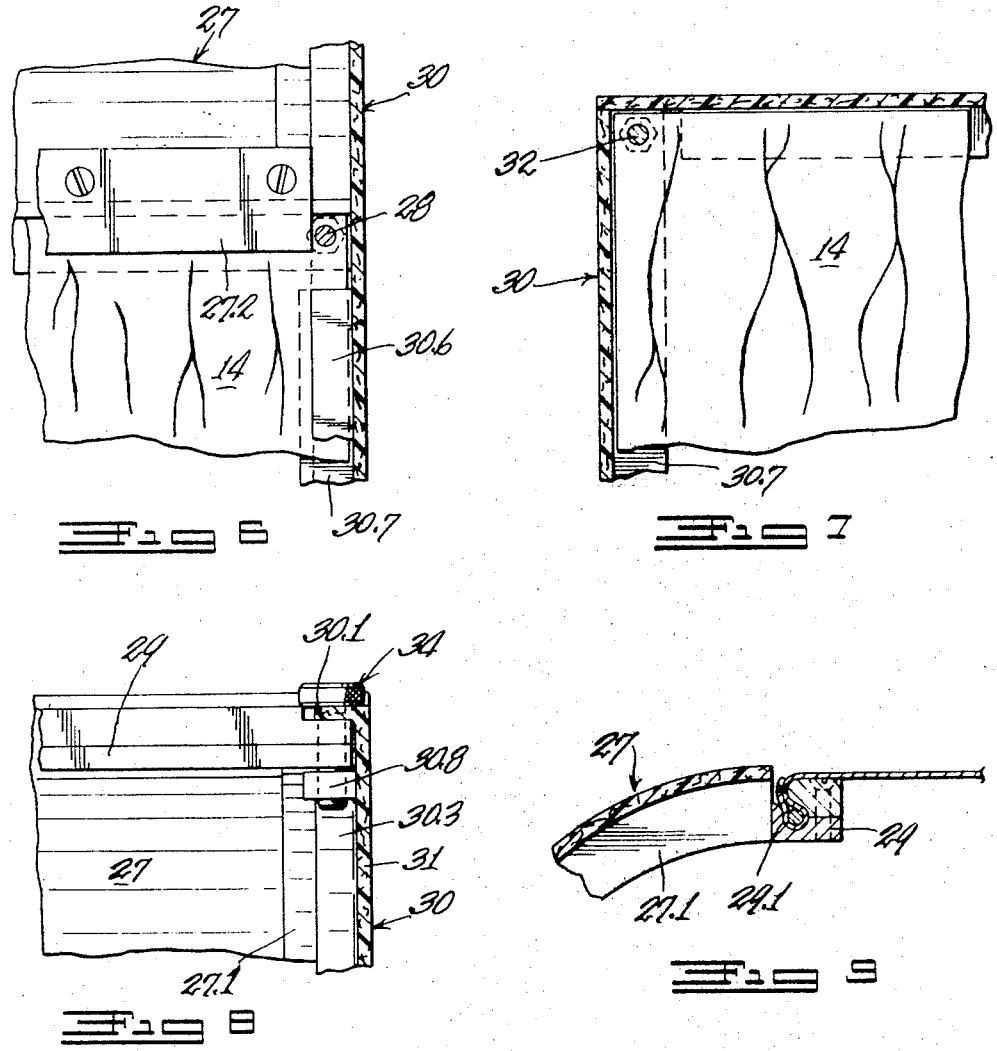

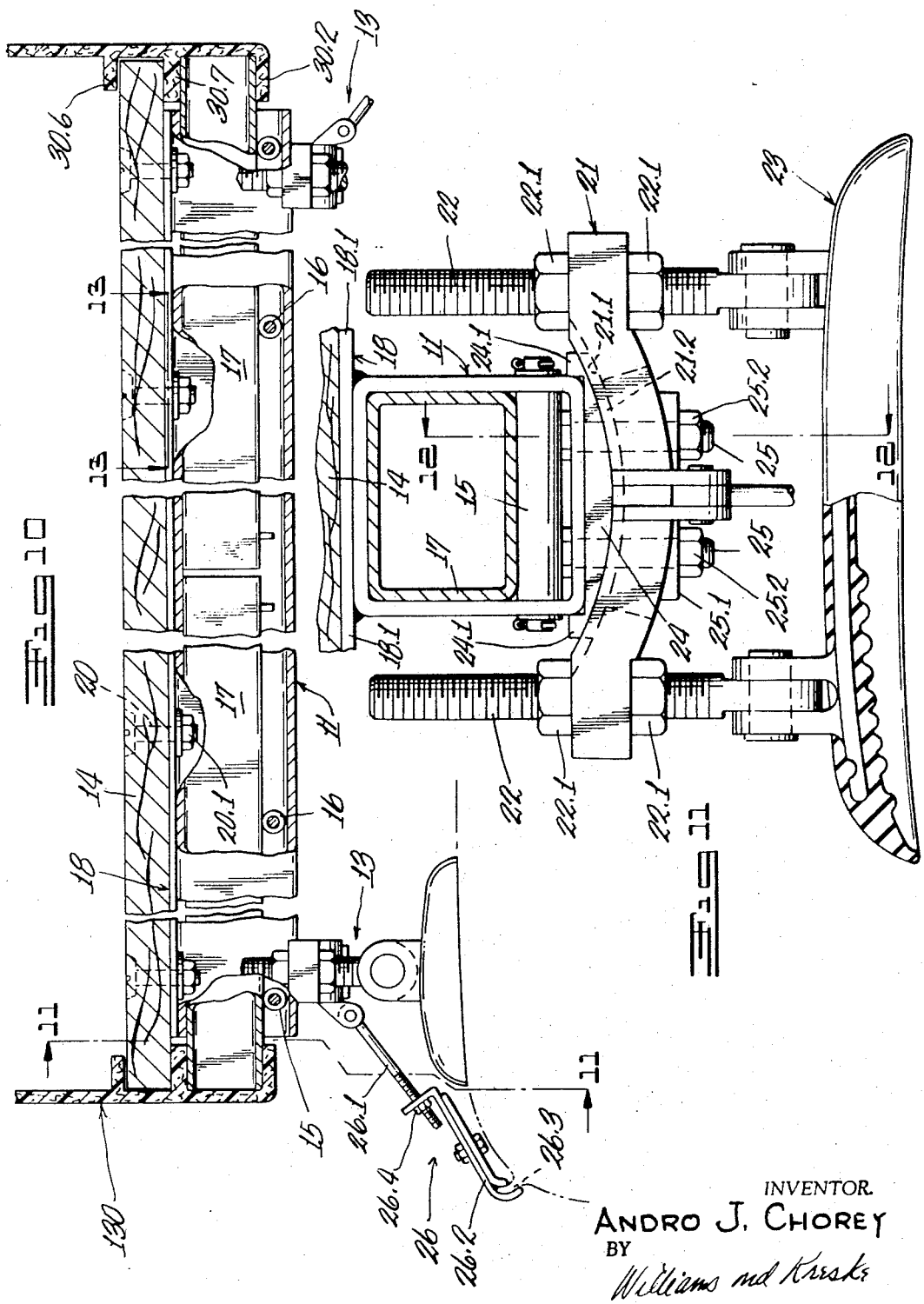

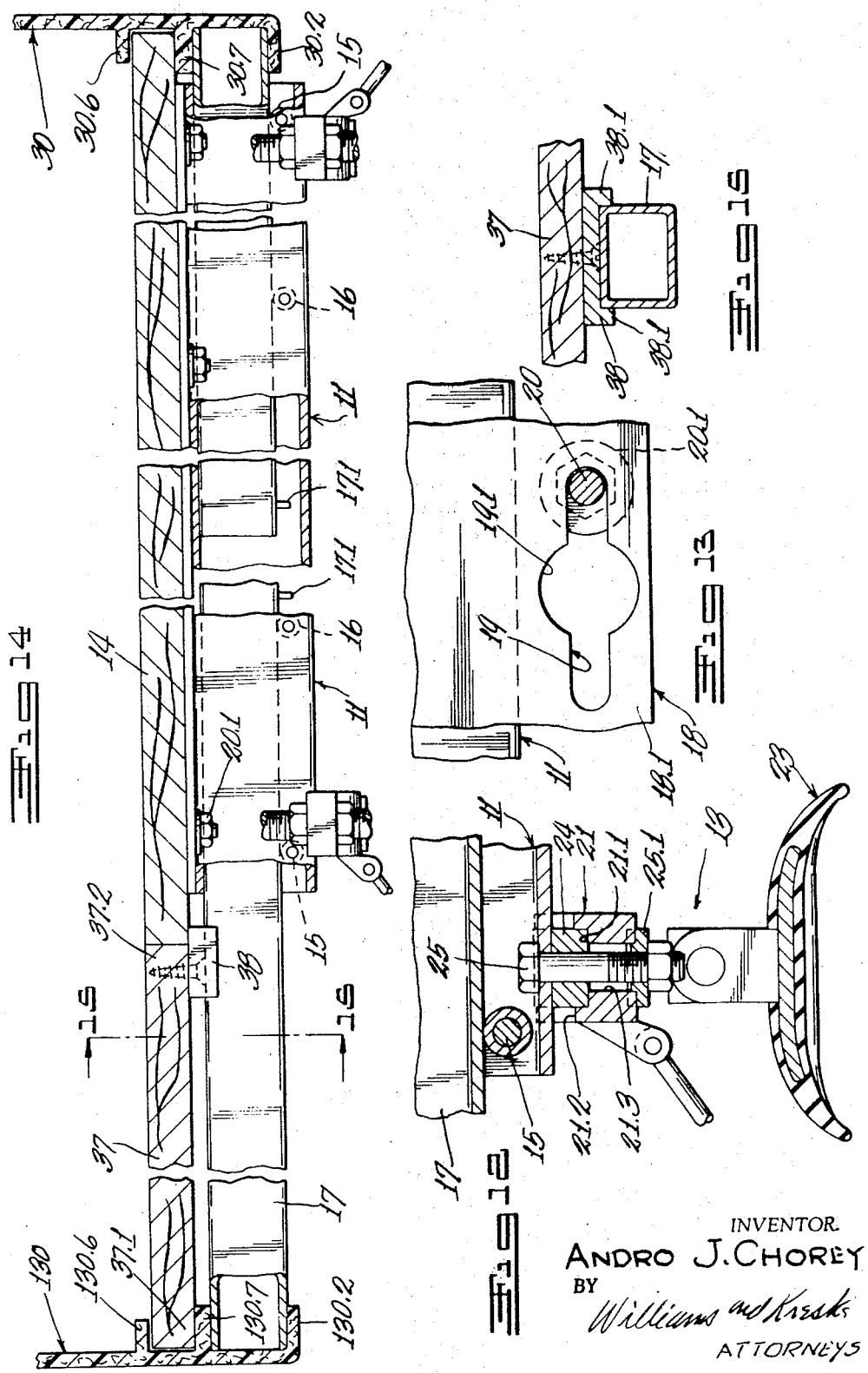

United States Patent Office 3,465,929
Patented Sept. 9, 1969

3,465,929
CAR TOP CARRIERS
Andro J. Chorey, 8315 Gibson Road,
Canfield, Ohio 44406
Filed Apr. 4, 1967, Ser. No. 628,487
Int. Cl. B60r 7/00, 9/00, 11/00
U.S. Cl. 224—42.01                4 Claims

ABSTRACT OF THE DISCLOSURE

A car top carrier adapted to be removably secured to the roof of an automotive vehicle which includes a weather-tight box having a floor, front rear and side walls, and a top. The top and all of the walls are removable from the floor when the latter is to be used alone and the floor is extensible to overhang the sides of the vehicle. When its area is to be temporarily increased, for example, to provide for erection of a tent thereover for camping purposes.

PREAMBLE

Heretofore, car top carriers have provided a pair of support beams to which a load may be secured, and in some instances, provision has been made for securing a box thereto in which a load may be carried for protection against the weather. Such prior art devices, however, have been limited in usefulness since certain constituent parts thereof could not easily be separated and used alone. Moreover, the basic design of many of such prior art devices has provided insufficient strength and adjustability to adapt them for varied purposes.

In addition to overcoming the foregoing shortcomings of prior art device, the present invention provides other advantages later to appear from a study of the following description and the drawings appended hereto.

In the drawings accompanying this specification and forming a part of this application, there is shown, for purpose of illustration, an embodiment which the invention may assume, and in these drawings:

FIGURE 1 is a broken, side elevational view of a device constructed in accordance with the present invention secured to the roof of a vehicle herein shown to be of the station wagon type, certain parts on the near side being removed to show the underlying structure, FIGURE 2 is a broken plan view of the device, certain parts on the near side being removed to shown the underlying structure, FIGURE 3 is an enlarged, broken sectional view generally corresponding to the line 3—3 of FIGURE 2, FIGURE 4 is a fragmentary sectional view generally corresponding to the line 4—4 of FIGURE 3, FIGURE 5 is a fragmentary sectional view generally corresponding to the line 5—5 of FIGURE 3, FIGURE 6 is a fragmentary sectional view generally corresponding to the line 6—6 of FIGURE 4, FIGURE 7 is a fragmentary sectional view generally corresponding to the line 7—7 of FIGURE 5, FIGURE 8 is a fragmentary sectional view generally corresponding to the line 8—8 of FIGURE 3, FIGURE 9 is a fragmentary sectional view generally corresponding to the line 9—9 of FIGURE 2, FIGURE 10 is a fragmentary, broken sectional view generally corresponding to the line 10—10 of FIGURE 3, certain parts on the near side being removed to show the underlying structure, FIGURE 11 is a further enlarged fragmentary sectional view generally corresponding to the line 11—11 of FIGURE 10, FIGURE 12 is a fragmentary sectional view generally corresponding to the line 12—12 of FIGURE 11, FIGURE 13 is a fragmentary sectional view generally corresponding to the line 13—13 of FIGURE 10, FIGURE 14 is a view similar to FIGURE 10 but showing certain parts in another position and with certain other parts added, and FIGURE 15 is a fragmentary sectional view generally corresponding to the line 15—15 of FIGURE 14.

DETAILED DESCRIPTION

As best seen in FIGURE 1, the present invention provides a car top carrier 10, herein shown, for purpose of illustration, mounted upon the roof of a station wagon W. In brief, carrier 10 comprises a plurality of support rails 11, presently disclosed as being three in number, extending transversely of the vehicle. Such rails are spaced-apart from each other longitudinally of the vehicle to underlie and support a box-like structure 12. Support assemblies 13 are disposed at opposite ends of each support rail 11 for securing the latter to the roof of the vehicle, box 10 being formed of a floor 14 along with front, rear, and side walls, as will later be disclosed in greater detail.

Since each support rail 11 and its associated parts is preferably identical, only one need be described in detail. Each rail 11 is preferably of tubular formation and square in cross-section and provides a pair of rollers 15 at respective ends thereof, as best shown in FIGURE 10. Spaced axially of rail 11 from respective rollers 15 are similar rollers 16, such rollers cooperating with the underside of the top wall of rail 11 to closely but slidably receive respective extension members 17 whose purpose will later appear. For the present, it need only be understood that each extension member 17 is slidable longitudinally of its support rail 11 from respective positions seen in FIGURE 10 wherein each member is shown almost entirely collapsed within its support rail, with only a short terminal portion thereof extending from the rail.

Welded or otherwise secured to the supper side of support rail 11 is a plate 18 which may extend from end-to-end of the rail 11. It is an important feature that plate 18 is somewhat wider than the rail to thus provide transversely extending portions 18.1 for reasons to be seen. Seated upon the rail plate 18 is the previously mentioned floor 14 which is removably secured to the plates in the following manner. As best seen in FIGURE 13, each of the portions 18.1 of the plates is provided with a plurality of spaced, slotted openings 19 having an enlarged center portion 19.1.

Extending through floor 14 and through slotted openings 19 are suitable bolts 20 (see also FIGURE 10) each having a nut and washer assembly 20.1 which can be drawn up to bear against the underside of respective plate portions 18.1. To facilitate assembly of the floor on top of the rails 11, it is only necessary to dispose the floor on top of the rail plates 18, with the bolts extending through the opening 19. Note that since the opening portion 19.1 is large enough to pass the nut-washer assembly 20.1, the latter may be pre-assembled with the bolts 20 before the floor is set in place. After setting the floor in place with the bolts extending through the opening portions 19.1, the floor will then be shifted to dispose the bolts 20 at one end of the opening 19 (see FIGURE 13) whereupon the nut-washer assemblies 20.1 may be tightened to draw the floor tightly to the rail plates 18. With the floor 14 assembled upon the rails 11, the floor side margins overhang the terminal portions of extension members 17 as best seen in FIGURE 10.

Turning now to the support assemblies 13, which are identical so that only one need be described in detail, each is herein shown to comprise a saddle 21 extending transversely of and underlying a support rail 11 as best seen in FIGURE 11. Extending through respective ends of saddle 21 are respective threaded rods 22 whose lower ends are pivoted to a suction cup 23. Nuts 22.1 are threaded on rods 22, both above and below the saddle member 21, and provide means for varying the vertical spacing between the support rail 11 and the vehicle roof on which the suction cup 23 is adapted to be disposed.

Still referring to FIGURE 11 but also shown in FIGURE 12, the intermediate portion of saddle 21 is provided with an arcuate surface 21.1 margined by upstanding flanges 21.2. Complementarily engaged with the surface 21.1 of the saddle is a shim 24 of a size to closely fit between the saddle flanges 21.2. The ends of shim 24 preferably provide upstanding flanges 24.1 for closely receiving the support rail 11 therebetween and extending through the support rail, the shim 24 and the intermediate portion of the saddle 21 are bolts 25 which secure the parts together. A filler member 25.1 underlies the saddle and presents a flat surface for engagement with nuts 25.2 on respective bolts 25. In order to provide for adjustment of support rail 11, along the arcuate surface 21.1 of saddle 21 to thus permit angular adjustment of the rail, bolts 25 pass through an elongated slot 21.3 formed in the saddle.

While the enlarged suction cups 23 herein shown are more than adequate to retain the carrier in position on the vehicle roof, supplemental means 26, as best seen in FIGURE 10 are also provided. As herein illustrated, a rod 26.1 is pivoted to saddle 21 and has at its end a clamp 26.2 for gripping the usual rain gutter 26.3 which normally extends along the sides of the vehicle roof. The effective length of rod 26.1 is, of course, adjustable by means of the nut 26.4 threaded thereon.

Turning now to the box structure 12 and referring first to FIGURE 3, the front of the box is preferably formed of a glass fiber impregnated resinous material for strength with light weight and provides a curved wall 27 strengthened by spaced-apart, structurally integral ribs 27.1. Front wall 27 extends generally from side-to-side of the floor 14 and is curved as shown to reduce wind resistance during forward vehicle movement. The lower portion of front wall 27 provides vertically spaced, upper and lower flanges 27.2, 27.3 for receiving the adjoining portion of floor 14 therebetween. As herein shown, lower flange 27.3 is formed integrally with the front wall; however, upper flange 27.2 is secured thereto by screws 27.4. The means in part securing the front wall 27 to the floor 14 comprises elongated bolts 28, whose additional functions will later be described, disposed at each front corner of the floor 14 and which pass through respective aligned apertures in the floor and the front wall lower flange 27.3 and are secured by nuts 28.1. A header bar 29 is structurally integral with the upper portion of front wall 27 and extends the full length thereof. The function of such bar and that of an upwardly facing, longitudinally extending groove 29.1 therein will later be disclosed. In addition to the front wall flanges 27.2, 27.3, front wall 27 has a depending, rearwardly turned flange 27.5 in registry with a corresponding flange formed in the side walls next to be described.

As seen in FIGURES 1 and 2, the box structure 12 is provided with side walls 30, 130 and, since such walls are identical but of opposite hand, only the side wall 30 will be described in detail. As best shown in FIGURE 3, side wall 30 extends from front to rear of floor 14 and has a forwardly extending tongue portion 31 closely fitting within the curved front wall 27 in abutment with the adjoining front wall rib 27.1 (see also FIGURE 2). For imparting rigidity to the side wall 30 and for other purposes to appear, such wall is provided with an upper, inwardly turned flange 30.1 (FIGURES 2, 3 and 4) a lower, inwardly turned flange 30.2 (FIGURES 3 and 10), and an inwardly turned flange 30.3 on the wall tongue portion 31 (FIGURE 2). For purpose of securing the side wall 30 to the floor 14, such wall has structurally integral, vertically spaced bosses 30.4 through which the adjoining elongated bolt 28 passes (FIGURES 3 and 4). Similarly and at the rear of side wall 30, the latter is provided with integral, vertically spaced bosses 30.5 through which passes an elongated bolt 32 which may be identical to bolt 28 and which likewise extends through an appropriate aperture in the floor 14 and has at its lower end a nut 32.1. As best seen in FIGURE 10, side wall 30 has flanges 30.6, 30.7, spaced to closely receive the floor 14 therebetween, the flange 30.7 and the previously described lower flange 30.2 being spaced to closely receive the free ends or terminal portions of the adjoining support rail extension members 17. With reference to FIGURE 5, the lower end of bolt 32 passes through an aperture in the side wall flange 30.7 with the nut-washer assembly 32.1 bearing against the underside of flange 30.7.

Rear wall 33, see FIGURES 2 and 3, fits between the side walls 30, 130 and has an inwardly directed, upper flange portion 33.1 in registry with the flange 30.1 of side wall 30 and, of course, with the corresponding flange of the opposite side wall 130. The end of rear wall 33 adjacent side wall 30 has an integral boss 33.2 which fits between the side wall bosses 30.5 and is also apertured to pass the bolt 32. Although not shown in detail, bolt 32 is duplicated at the opposite side of the carrier along with appropriate side and rear wall bosses corresponding to those hereinabove described. From the foregoing, it will be clear that the bolts 32, 32 function to secure the rear wall 33 to respective side walls 30, 130 and through the agency of such side walls, to the floor 14.

Still referring to FIGURE 3 but as also seen in FIGURE 8, side wall 30 has an integral boss 30.8 which underlies the previously mentioned header bar of front wall 27. A headed screw 34, knurled for finger operation, extends through aligned apertures in the side wall flange 30.1 and the header bar 29 and is threaded into the side wall boss 30.8 to both secure the side wall and the front wall together but also for another function next to be described.

In order to cover the box structure thus far described and prevent entrance of rain or snow which might damage articles carried within the box, there is provided a waterproof fabric cover 35 (FIGURE 2) having a dowel or the like enclosed in its forward end and adapted to fit within the groove 29.1 (FIGURE 3) of the header bar 29. A retainer 36 rests upon the bar 29 and has a groove 36.1 which cooperates with the groove 29.1 to closely receive the forward end aforesaid of the cover 35. Retainer 36 is apertured to pass the screw 34 and is clamped against the bar 29 to hereby firmly but removably retain the forward end of the cover attached to the header bar 29. While only the screw 34 adjacent the side wall 30 has been described in detail, it will be understood that an identical screw 34 (FIGURE 2) and associated parts will be provided adjacent the side wall 130.

To insure a tight seal between the cover 35 and the box structure, the cover not only overlies the side walls 30, 130 and the rear wall 33, it may be formed with a depending skirt 35.1 which lies along the upper outer margins of respective side and rear walls and is removably secured thereto by the usual snap connections 35.2. Since the bolts 28, 32 lie within the confines of the cover 35, the latter may be suitably apertured to pass respective bolts.

With the construction thus far described, it will be understood that the box structure may be utilized with or without the cover 35 as desired. Moreover, in the event it is desired to use the floor 14 as a platform without the front, side and rear walls, this may readily be accomplished by removing the bolts 28, 32, whereupon all of the walls may be removed from the floor. Finally, if it is desired to use the support rails 11 without the superposed floor, this may be readily be accomplished by loosening the bolts 20 and disengaging their nut-washer assemblies 20.1 from the support rail plates 18 by shifting the floor to align such assemblies with the enlarged plate-slot-intermediate portions 19.1 and then lifting the floor from the support rails. Thereafter, the slots 19 may be used to anchor the usual hold down straps (not shown) by means of which a load may be secured directly to the support rails. Although not previously described, it is to be noted that each of the bolts 28, 32 provides an eye 37 at its upper end to which may be attached a suitable hoisting device so that the entire carrier may be bodily lifted for removal from the vehicle or installation thereupon.

It may be desirable at times to temporarily increase the width of carrier floor 14 to, for example, permit erection of a tent thereupon and this may be effected as follows: Assuming the near side of floor 14, as viewed in FIGURE 1, is to be expanded, the cover 35 will first be removed by releasing the snaps 35.2 and removing the screws 34 and the retainer 36. The nuts at the lower ends of the rear-side bolts 28, 32 will be removed and the former will be elevated sufficiently to withdraw it from its aperture in the floor while the latter will be elevated sufficiently to withdraw it from its aperture in the rear wall boss 33.2.

With reference now to FIGURE 14, the left side extensions 17 may now be withdrawn from their support rails 11, carrying with them the side wall 130. Extensions 17 may be withdrawn from their support rails 11 an amount slightly more than is shown in FIGURE 14, outward movement of the extensions being limited by engagement of tabs 17.1, struck out of members 17, with respective rollers 16. With the extensions pulled out as far as possible, a floor side piece 37 will be disposed with its outer edge 37.1 between the side wall flanges 130.6, 130.7 and with its inner edge 37.2 adjacent the adjoining edge of the floor 14. Note that saddles 38 are secured to the underside of floor side edge 37.2 and rest upon respective extension members 17 (see also FIGURE 15). Each saddle functions as a spacer to support the floor side and is provided with depending flanges 38.1 for closely receiving respective extensions 17 therebetween. For interlocking purposes, each saddle preferably projects for engagement beneath the adjoining edge of floor 14 when the extensions 17 and the side wall 130 have been shifted to the position seen in FIGURE 14. With the parts positioned as seen in FIGURE 4, the previously elevated bolts 28, 32 will be lowered to project through respective aligned apertures in the floor side 37 and their nut assemblies then installed as before to thus retain the side 130 assembled with the floor side 37.

While only one floor side piece 37 has herein been disclosed, it will readily be understood that a similar floor side piece may installed adjacent to side wall 30 to further increase floor area.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:
1. A car top carrier, comprising a pair of support rails secured to the car top crosswise thereof and spaced apart longitudinally thereof, the means for securing said rail to said car top comprising a saddle member for each end of each rail, each saddle member having its lower end secured to the car top and having an upwardly facing arcuate slide surface, and each rail end having a depending shim member with a lower surface of arcuate shape complementary to the shape of a respective slide surface and fitting therein for sliding adjustment therealong, and means for securing each shim member in an adjusted position along its slide surface.

2. A car top carrier, comprising a pair of tubular support rails, each rectangular in cross-section, for securement to the car top crosswise thereof and spaced apart longitudinally thereof,
a pair of extension members slidably carried by said support rails, each said extension member being rectangular in cross-section but smaller than the cross-section of said support rails to telescopically fit therewithin, said extension members including terminal portions projecting from said support rails when said members are in normal fully retracted position,
and means cooperatively associated with said extension member terminal portions and said support rails to releasably retain said extension members in normally telescoped and nonextended relation within said support rails,
said means including a floor spanning said support rails and having side edge portions overhanging said extension member terminal portions,
said floor having a detachable connection to said support rails to form a rigid platform structure, and having a detachable connection to said terminal portions.

3. The construction of claim 2 wherein said detachable connection between said floor and said terminal portions includes vertically extending side closure members adjacent said floor side edge portions, and bolt means securing said side closure members to said floor.

4. A car top top carrier, comprising a pair of tubular support rails, each rectangular in cross-section, for securement to the car top crosswise thereof and spaced apart longitudinally thereof,
a pair of extension members slidably carried by said support rails, each said extension member being rectangular in cross-section but smaller than the cross-section of said support rails to telescopically fit therewithin,
a floor spanning said support rails and having side edge portions overlying said terminal portions and rigidly connected thereto to form a rigid platform structure, and an auxiliary floor portion connected to and overlying said extension members when the latter are telescopically extended from retracted position.

References Cited

UNITED STATES PATENTS

| | | |
|---|---|---|
| 2,805,014 | 9/1957 | Oslund. |
| 3,132,755 | 5/1964 | Greenslate _____ 214—83.24 |
| 2,870,774 | 1/1959 | Blosser. |
| 2,890,852 | 6/1959 | Bradley. |
| 2,938,525 | 5/1960 | MacKinlay. |
| 3,104,042 | 9/1963 | Gaus. |
| 3,186,567 | 6/1965 | Blair _____ 214—510 |
| 3,231,161 | 1/1966 | Calthorpe. |

FOREIGN PATENTS 1,333,369  6/1963  France.

ROBERT G. SHERIDAN, Primary Examiner

U.S. Cl. X.R.

224—42.1